Dec. 19, 1967     A. ALECCI     3,358,776

LAWN EDGER

Filed Dec. 8, 1964

INVENTOR.
ALBERT ALECCI
BY

ATTORNEY

United States Patent Office 3,358,776
Patented Dec. 19, 1967

3,358,776
LAWN EDGER
Albert Alecci, Cleveland Heights, Ohio, assignor of one-fourth to Stanley M. Fisher and John Giarrizzo
Filed Dec. 8, 1964, Ser. No. 416,932
4 Claims. (Cl. 172—18)

ABSTRACT OF THE DISCLOSURE

A lawn edger having connected, spaced parallel blades and a spring-biased sod remover mounted therebetween. A handle is mounted near the top of the blades and extends upwardly therefrom.

Background of the invention

In order to give lawns a well-cared for, manicured appearance, an edge is often cut along hard surfaces such as sidewalks and driveways. The edging has the effect of removing a relatively thin slice of lawn immediately adjacent the hard surface. Edging is normally a frustrating undertaking with the normal tool which is a half moon shaped plate having its straight end connected to a handle and its curved end acting as a cutting edge. The normal procedure is to cut large swatches of lawn at some portions and very thin pieces at others. The net result is an uneven edge.

Once an edge has been cut on the lawn, the scrap sod must be picked up, or more accurately, ripped up and placed in a container.

Various solutions have been proposed to the problem of cutting an accurate edge on a lawn with a minimum of effort. Patent No. 951,547 to Randall proposes a lawn edger having parallel blades which merge into a trough-like form. The blades have a cutting edge along one side. At an obtuse angle to the cutting edges is a handle which is rigidly attached to the cutting and digging element. The edger is used by inserting one blade adjacent a sidewalk and the other blade into the sod alongside the walk. The implement is then simply drawn by hand along the walk in an attempt to make two incisions in the sod. Subsequently, the implement is reversed and the trough side is placed in contact with the sod so that an edge cuts underneath it and removes it.

The disadvantages of such a device are readily apparent. In the first instance, sod, especially in the summer and fall, could not be cut by simply dragging two cutting edges along the top of the lawn. As mentioned above, the common type of device must be shoved into the ground by pressure from the operator's foot. It would take an extremely strong individual to hold enough pressure on the blades in order to have them continuously penetrate the sod. That is, there would be a natural tendency for the blades simply to slide out of the sod and ride on top of the lawn.

The elaborate apparatus of the Johnson Patent No. 2,950,769 clearly points out that a large force is required to hold the blades into the sod.

This invention provides a lawn edger which will accurately cut a strip of sod along the edge of a sidewalk or driveway. Each cut will be of the same width and a means is provided on the present invention for picking up the sod with the tool and then quickly removing the sod to place it in a container. Alternately, the sod may be rejected from the tool onto the ground where it can be subsequently gathered.

It is an important object of this invention to provide a new and improved method to remove the grass and sod along driveways and sidewalks, and to provide a margin separating the lawn areas from sidewalks and driveways.

It is an important object of this invention to provide a simple and inexpensive hand operated means for providing a straight line edge on lawns.

It is still another impotrant object of this invention to provide a mechanical means for the ejection of sod from between the blades of the edging tool.

Summary of the invention

This invention relates to an edger comprising two parallel spaced blades having cutting edges along their bottommost length. The top edges of the blades join with the side edges to form shoulders on which pressure may be applied by the operator with his foot to insert the cutting edges into the sod. A handle is secured to at least one of the blades and a means for removing sod which is picked up by the parallel blades is mounted therebetween.

Further objects and advantages will appear from the following descriptions and drawings wherein.

Figure 1:
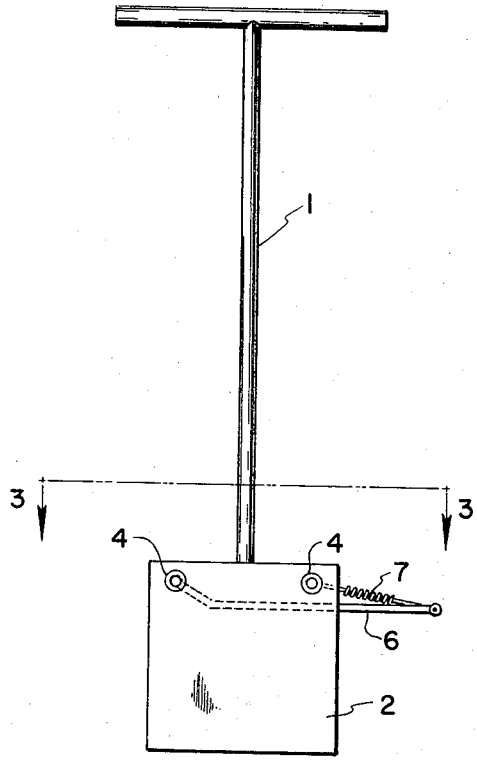
FIGURE 1 is a front side view of the tool illustrating its shape and components.
Figure 2:
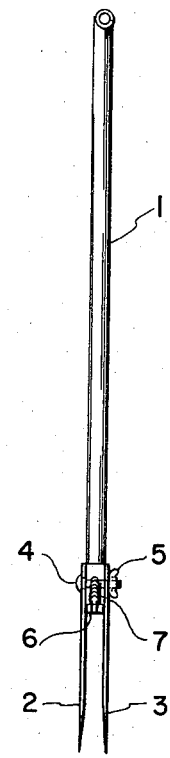
FIGURE 2 is a side view of the tool illustrating the two blades and the sod ejection lever.

As illustrated in FIGS. 1 and 2, the lawn edger of this invention has a handle 1 which is operatively connected to blades 2 and 3. The blades 2 and 3 are of a generally rectangular configuration although other shapes are possible. The top edge of the blades are perpendicular to the handle and form shoulders with the sides of the blades 2 and 3. The shoulders are used by the operator to apply foot pressure to the blades in order to insert them into the sod. The bottom edges of the blades are generally tapered so that they will be sharp enough to easily penetrate even hardened sod.

The handle 1 is normally positioned equidistant between the side edges of the blades 2 and 3 and is secured thereto by some normal means such as being threadedly engaged, welded, etc. Handle 1 may also have a cross bar at the end opposite the blades in order to provide a convenient grip for the operator.

The blades 2 and 3 are shown secured together by means of threaded fasteners 4 and wing nuts 5. A spacer of some type, of course, must be positioned between the blades 2 and 3 in order to secure them at the correct distance. It is anticipated that this distance may vary depending on the wishes of the manufacturer and/or operator. Alternately, the blades may be connected by a permanent cross piece.

Figure 3:
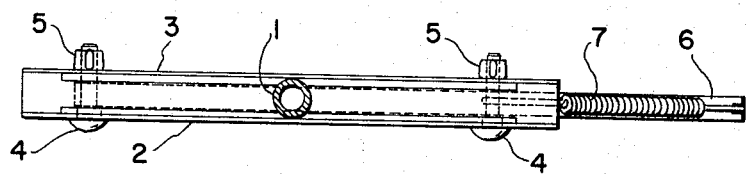
FIGURE 3 is a top view, with cross section, showing the cutting blades and ejection mechanism in position.

A sod remover (FIG. 3) has an arm 6 which is positioned between the blades 2 and 3 and is hingedly secured at the fasteners 4. The arm 6 is spring biased upwardly by a spring 7 having one end attached to a fastener 4 and the other end to the arm 6.

In operation the handle is gripped at its upper portion and one of the blades is placed along the edge of a sidewalk or driveway. Foot pressure is then applied to the shoulders of the blades 2 and 3, which are thereby forced into the sod, thus cutting a strip equal in width to the spacing of the blades 2 and 3. As the blades cut the sod and move downwardly, they naturally compress the sod between them. When the edger is removed from its position, the sod is normally held therein by friction and the compressive force. In order to remove the sod, the operator need only push down with his foot on the sod remover and force the sod from between the blades. The natural resiliency of the spring 7 will return the arm 6 to its position near the top of the blades thus readying the instrument for use. The whole procedure usually takes, at most, a few seconds.

For ease of description, the principles of the invention have been set forth in connection with but a single illustrated embodiment. It is not our intention that the illustrated embodiment nor the terminology employed in describing it be limiting inasmuch as variations in these may be made without departing from the spirit of the invention. Rather we desire to be restricted only by the scope of the appended claims.

I claim:
1. A lawn edger for cutting uniform strips of sod along a straight surface comprising:
   a first blade;
   a second blade spaced part but operatively connected and substantially parallel to said first blade;
   the top edges of said blades forming shoulders with the side edges of said blades so that the operator may apply pressure with his foot to the shoulders thereby forcing the blade into the sod;
   cutting surfaces on the bottom edges of said blades;
   a handle having one end operatively connected to at least one of said blades and extending upwardly therefrom;
   a spring-biased rotatably mounted arm connected to said lawn edger and positioned between and extending outwardly from between said blades to permit manual ejection of sod from between said blades.
2. The lawn edger of claim 1 wherein said arm has one end rotatably mounted to a spacing means between the blades, the other end of said arm extending outwardly from between the sides of said blades at a point near the top edges of said blade and a spring connecting said arm to a point on said lawn edger near the top edge of said blades.
3. The lawn edger of claim 1 wherein said handle is secured equidistant from the sides of and is parallel to said blades, said blades having a piece coextensive with their upper edges to provide an extended surface on which the operator may apply foot pressure.
4. The lawn edger of claim 3 wherein said blades are generally of a rectangular shape.

References Cited
UNITED STATES PATENTS

| | | | |
|---|---|---|---|
| 754,370 | 3/1904 | Hunter | 294—50.5 |
| 951,547 | 3/1910 | Randall | 172—13 |
| 2,950,769 | 8/1960 | Johnson | 172—17 |

ABRAHAM G. STONE, *Primary Examiner.*

WILLIAM A. SMITH III, *Examiner.*

A. E. KOPECKI, *Assistant Examiner.*